US010822085B2

(12) United States Patent
Ott et al.

(10) Patent No.: US 10,822,085 B2
(45) Date of Patent: Nov. 3, 2020

(54) AUTOMATED CARTRIDGE REPLACEMENT SYSTEM FOR UNMANNED AERIAL VEHICLE

(71) Applicant: Rantizo, Inc., Iowa City, IA (US)

(72) Inventors: Michael Ott, Iowa City, IA (US); Gerald Beranek, Iowa City, IA (US)

(73) Assignee: RANTIZO, INC., Iowa City, IA (US)

( * ) Notice: Subject to any disclaimer, the term of this patent is extended or adjusted under 35 U.S.C. 154(b) by 0 days.

(21) Appl. No.: 16/801,448

(22) Filed: Feb. 26, 2020

(65) Prior Publication Data

US 2020/0283147 A1  Sep. 10, 2020

Related U.S. Application Data

(60) Provisional application No. 62/814,487, filed on Mar. 6, 2019.

(51) Int. Cl.
| *B64D 1/18* | (2006.01) |
| *B64C 39/02* | (2006.01) |
| *B05B 13/00* | (2006.01) |
| *A01M 7/00* | (2006.01) |

(52) U.S. Cl.
CPC .............. *B64D 1/18* (2013.01); *B05B 13/005* (2013.01); *B64C 39/024* (2013.01); *A01M 7/0089* (2013.01); *B64C 2201/128* (2013.01)

(58) Field of Classification Search
CPC ... B64D 1/18; B64C 39/024; B64C 2201/128; B05B 13/005; A01M 7/0089
See application file for complete search history.

(56) References Cited

U.S. PATENT DOCUMENTS

| 4,055,303 | A | 10/1977 | Brown | |
| 7,717,356 | B2 | 5/2010 | Petersen | |
| 9,382,003 | B2* | 7/2016 | Burema | B64C 39/024 |
| 9,567,077 | B2 | 2/2017 | Mullan et al. | |
| 10,538,316 | B2* | 1/2020 | Chen | B64C 27/08 |
| 2012/0083945 | A1* | 4/2012 | Oakley | B64C 25/52 |
| | | | | 701/2 |
| 2013/0068892 | A1* | 3/2013 | Bin Desa | B64C 39/024 |
| | | | | 244/190 |
| 2014/0246545 | A1* | 9/2014 | Markov | B64C 39/024 |
| | | | | 244/190 |
| 2016/0364989 | A1 | 12/2016 | Speasl et al. | |
| 2018/0064094 | A1 | 3/2018 | Vargas et al. | |
| 2018/0065747 | A1 | 3/2018 | Cantrell et al. | |

(Continued)

FOREIGN PATENT DOCUMENTS

| CN | 205922634 U | 2/2017 |
| CN | 206182172 U | 5/2017 |

(Continued)

*Primary Examiner* — Valentina Xavier
(74) *Attorney, Agent, or Firm* — Shuttleworth & Ingersoll, PLC; Jason R. Sytsma

(57) ABSTRACT

A manifold attached to the UAV and a cartridge removably and replaceably attached to the manifold. Inside the cartridge is a removable insert for drawing contents out of the cartridge with a suction tube selectively positioned in fluid communication with a pump for removing chemicals from the cartridge for application by the UAV. The suction tube comprises a plurality of baffles around its circumference for dampening movement of the chemicals in the cartridge while the UAV is in motion.

19 Claims, 16 Drawing Sheets

(56) References Cited

U.S. PATENT DOCUMENTS

| | | | | |
|---|---|---|---|---|
| 2018/0093284 A1* | 4/2018 | Harris | ................... | B05B 12/12 |
| 2018/0273158 A1* | 9/2018 | Courtin | ................... | B64C 1/26 |
| 2018/0290745 A1 | 10/2018 | Kumada | | |
| 2019/0031346 A1 | 1/2019 | Yong et al. | | |
| 2019/0168874 A1* | 6/2019 | Steelman | ................. | A01M 7/00 |
| 2019/0185163 A1* | 6/2019 | Thomas | ............... | A62C 3/0228 |

FOREIGN PATENT DOCUMENTS

| | | |
|---|---|---|
| CN | 207389563 U | 5/2018 |
| CN | 108594856 A | 9/2018 |
| CN | 109279015 A | 1/2019 |
| CN | 109287223 A | 2/2019 |
| CN | 109445457 A | 3/2019 |
| CN | 109649658 A | 4/2019 |
| CN | 208868296 U | 5/2019 |
| CN | 110199975 A | 9/2019 |
| KR | 20190112540 A | 10/2019 |
| WO | 2019092707 A1 | 5/2019 |

* cited by examiner

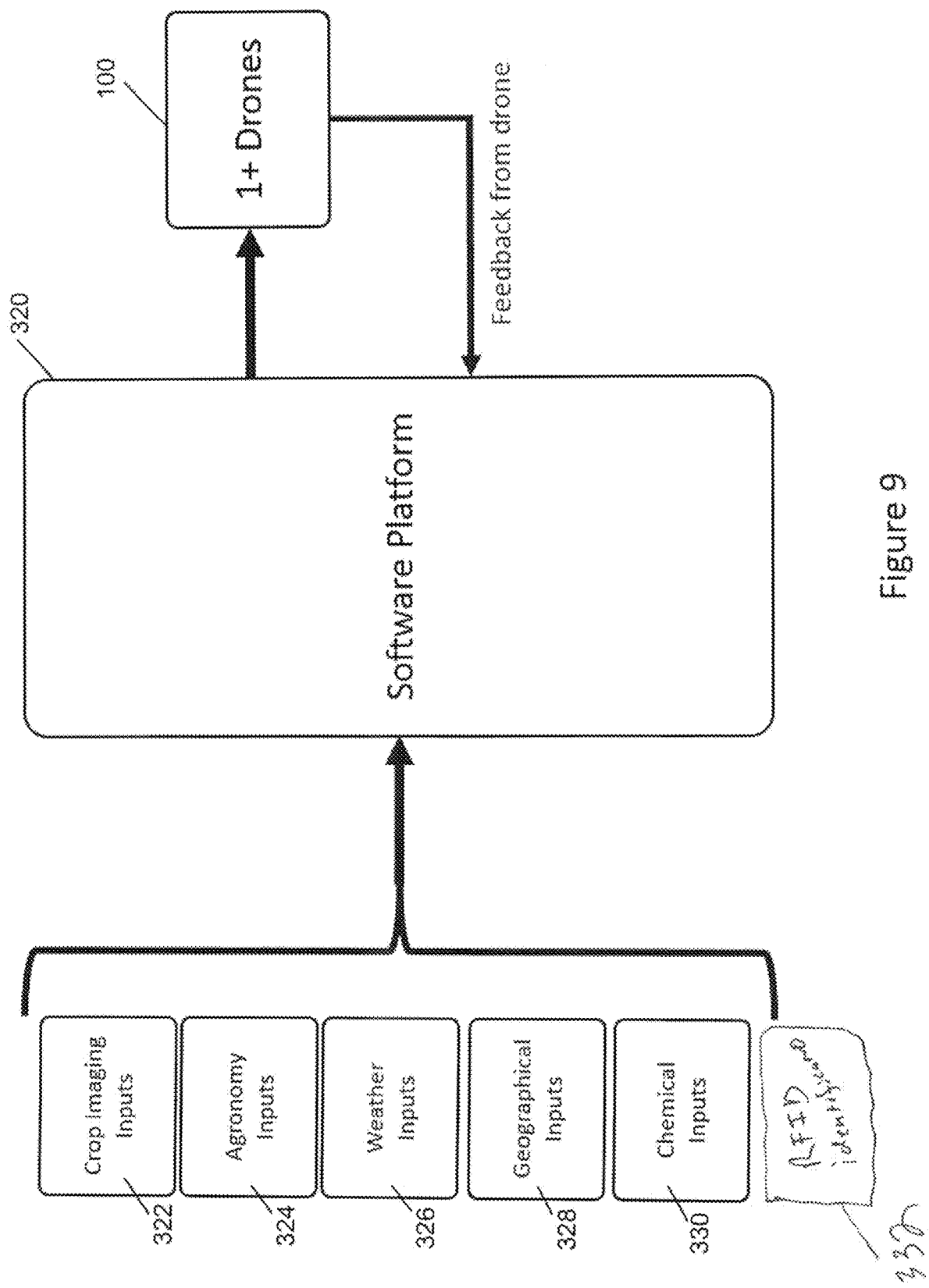

AUTOMATED CARTRIDGE REPLACEMENT SYSTEM FOR UNMANNED AERIAL VEHICLE

CROSS-REFERENCE TO RELATED APPLICATIONS

The present application claims the benefit of U.S. Provisional Patent Application No. 62/814,487 filed Mar. 6, 2019, the contents of which are incorporated herein by reference.

TECHNICAL FIELD

This disclosure relates to an automatic replacement system of unmanned aircraft equipped, and more specifically, this disclosure relates to refillable, reusable cartridges with anti-sloshing baffles and tendering and tracking technology.

BACKGROUND INFORMATION

Crop production systems have evolved rapidly over the past century and have resulted in significantly increased yields. But traditional farming methods come with undesirable environmental side-effects, such as soil degradation and erosion, excessive use of farm power inputs, pollution from chemical and organic fertilizers and other agrochemicals, and a loss of bio-diversity are just a few of the examples that have been highlighted over recent years.

Rapid advancements in technology have made automated and semi-automated farming as a sustainable and economic alternative to current farming systems. Automated farming is an alternative to current farm mechanization that will allow implementation of a farming model that drastically optimizes productivity in a sustainable and economic manner to address labor shortages.

Automated farming can take advantage of small, agile, lightweight, energy-efficient automated robotic equipment to do the same job on a plant by plant basis that is currently being done by powerful ground equipment that weighs several tons and treats uniformly tens of hectares per hour. Unmanned aerial vehicles (UAVs) that are equipped with detachable implements and cartridges can use high-precision GPS to autonomously perform crop dusting, planting, fertilizing and other field related farming or husbandry tasks. The subsystems for the control, refill, recharge and communication subsystems of the aerial farm robots are part of the overall automated farming system, and can autonomously handle most of the husbandry tasks on a farm.

BRIEF SUMMARY

In accordance with various embodiments, disclosed is an unmanned aerial vehicle (UAV) comprising a manifold attached to the UAV and a cartridge removably and replaceably attached to the manifold. Inside the cartridge is a removable insert for drawing contents out of the cartridge with a suction tube selectively positioned in fluid communication with a pump for removing chemicals from the cartridge for application by the UAV. The suction tube comprises a plurality of baffles around its circumference for dampening movement of the chemicals in the cartridge while the UAV is in motion.

An RFID tag can be attached to the cartridge for communication with an RFID reader combined to the UAV for uniquely identifying the cartridge, which is associated with instructions for determining the operation of the pump or the UAV.

The cartridge can comprise a depressed bottom for directing chemicals in the cartridge to the bottom for emptying the cartridge by the pump via the suction tube. The suction tube of the insert extends substantially near the cone bottom to draw out the contents of the cartridge. In such an implementation, the cartridge can comprise a base surrounding the insert allows the cartridge to stand upright.

Similarly, a system for tendering chemicals to an unmanned aerial vehicle (UAV) for application in an area of interest by the UAV is disclosed. A cartridge for storing chemicals to be applied by the UAV in an area of interest is provided with a removable insert combinable to the cartridge. A suction tube connected to the insert is selectively positioned in fluid communication with a pump for removing chemicals from the cartridge for application by the UAV. The suction tube can be surrounded by a plurality of baffles around its circumference for dampening movement of the chemicals while the UAV is in motion. An RFID tag adapted for communication with an RFID reader combined to the UAV can be provided for uniquely identifying the cartridge for determining the operation of the pump or the UAV.

BRIEF DESCRIPTION OF THE DRAWINGS

These and other features and advantages of the present invention will be better understood by reading the following detailed description, taken together with the drawings wherein:

FIG. 9 shows a software platform with inputs and a feedback response with the UAV of FIG. 1 that resides in the control system of FIG. 8.

DETAILED DESCRIPTION OF THE PREFERRED EMBODIMENTS

Figure 1:
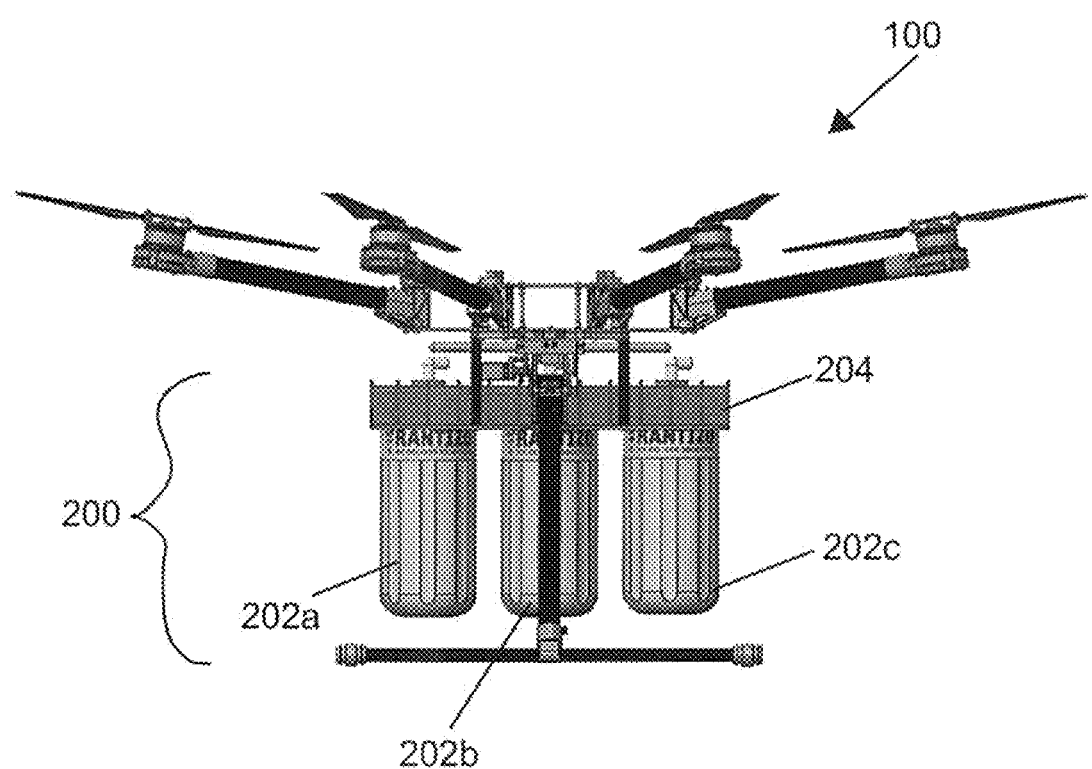
FIG. 1 is a front-facing view of an unmanned aerial vehicle (UAV) with a spraying tool set according to this disclosure.
Figure 2:
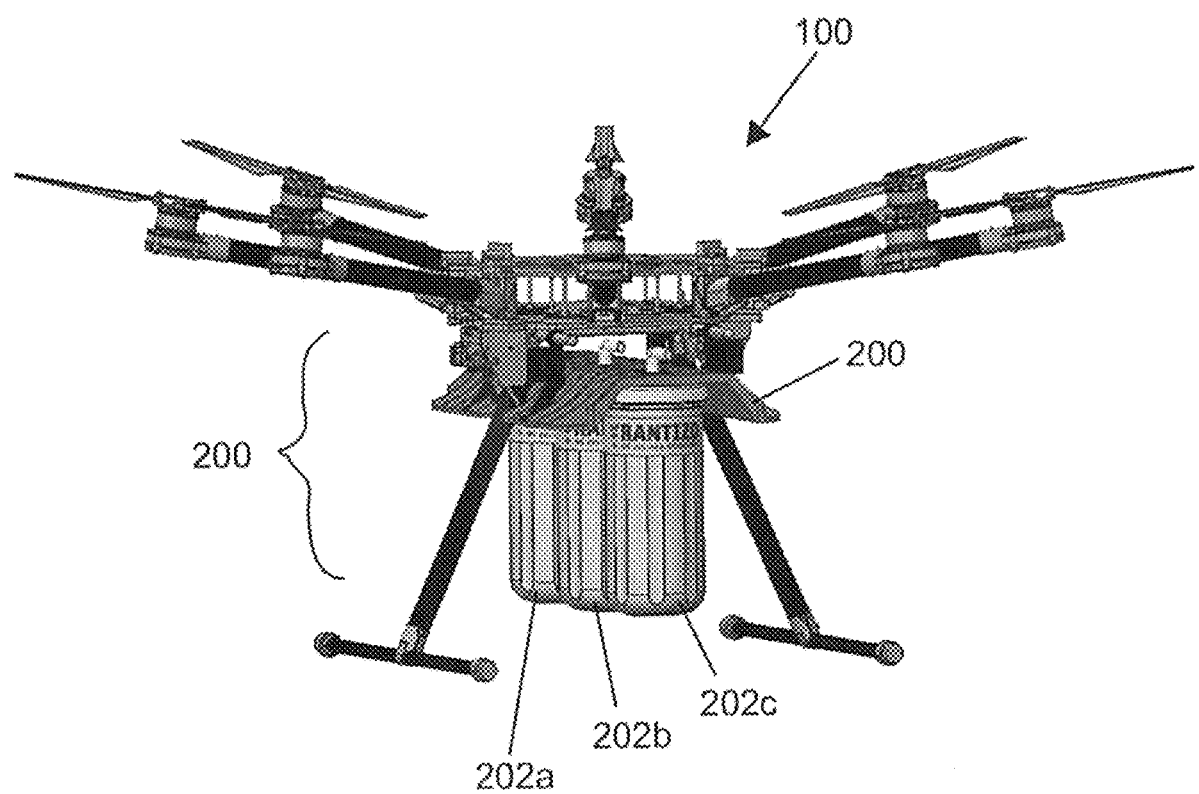
FIG. 2 is a perspective view of the UAV of FIG. 1.

FIGS. 1-2 show an unmanned aerial vehicle (UAV) 100 that can fly and execute at least some tasks autonomously using its built-in central processing unit (CPU) in conjunction with a series of sensors such as a gyroscope, accelerometer, magnetometer (compass), barometer, sonar, optical flow, energy consumption and voltage meter, and GPS module. These sensors provide motor inputs, height, pitch, roll, heading, position, attitude, high-precision absolute and relative location, obstacle detection, distance detection, and speed control. Instructions for the tasks to be executed are sent via a wireless communication network to one or more UAVs 100 from a control system that provides an interactive interface to an operator that can input the tasks to be executed using a simple interface. These tasks can be programmed before a flight or can include modifications that are made in-flight. UAV 100 can include one or more motors mounted on a frame with electronic and communications equipment attached thereto. The number of motors can vary from depending upon the amount of thrust required to lift UAV 100 with its payload. UAV 100 can be semi-autonomous or fully-autonomous and be multi or single-rotor.

Figure 3:
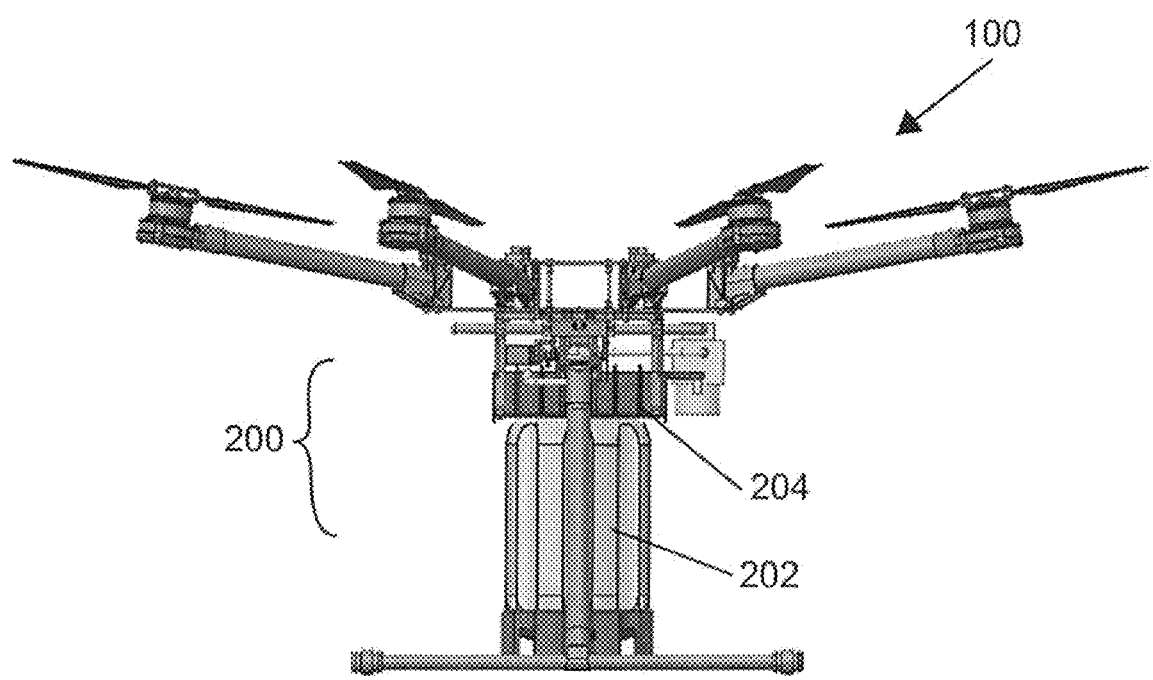
FIG. 3 is a side view of the UAV of FIG. 1.
Figure 4A:
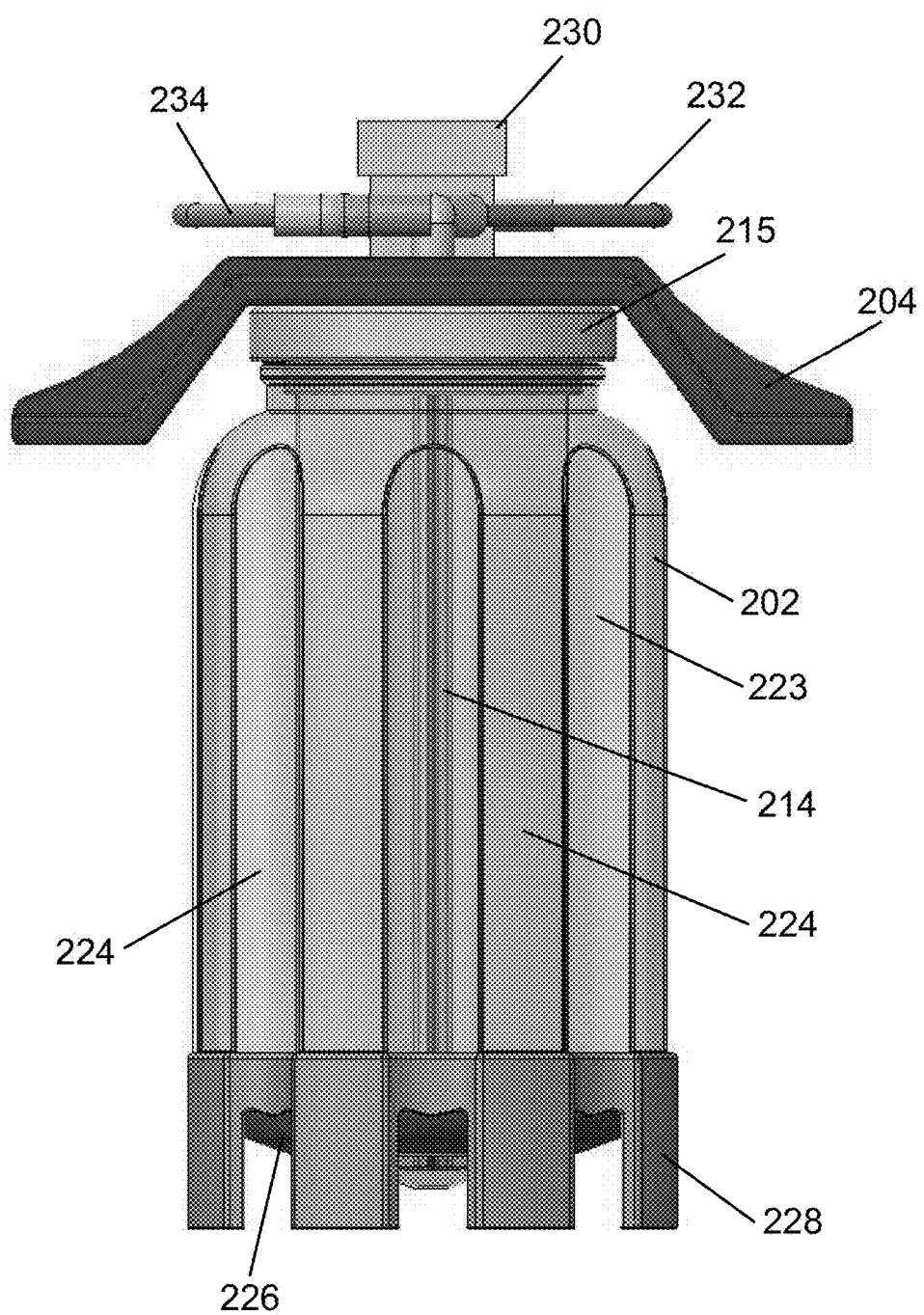
FIG. 4A is a front view of the spraying toolset of FIG. 1.
Figure 4B:
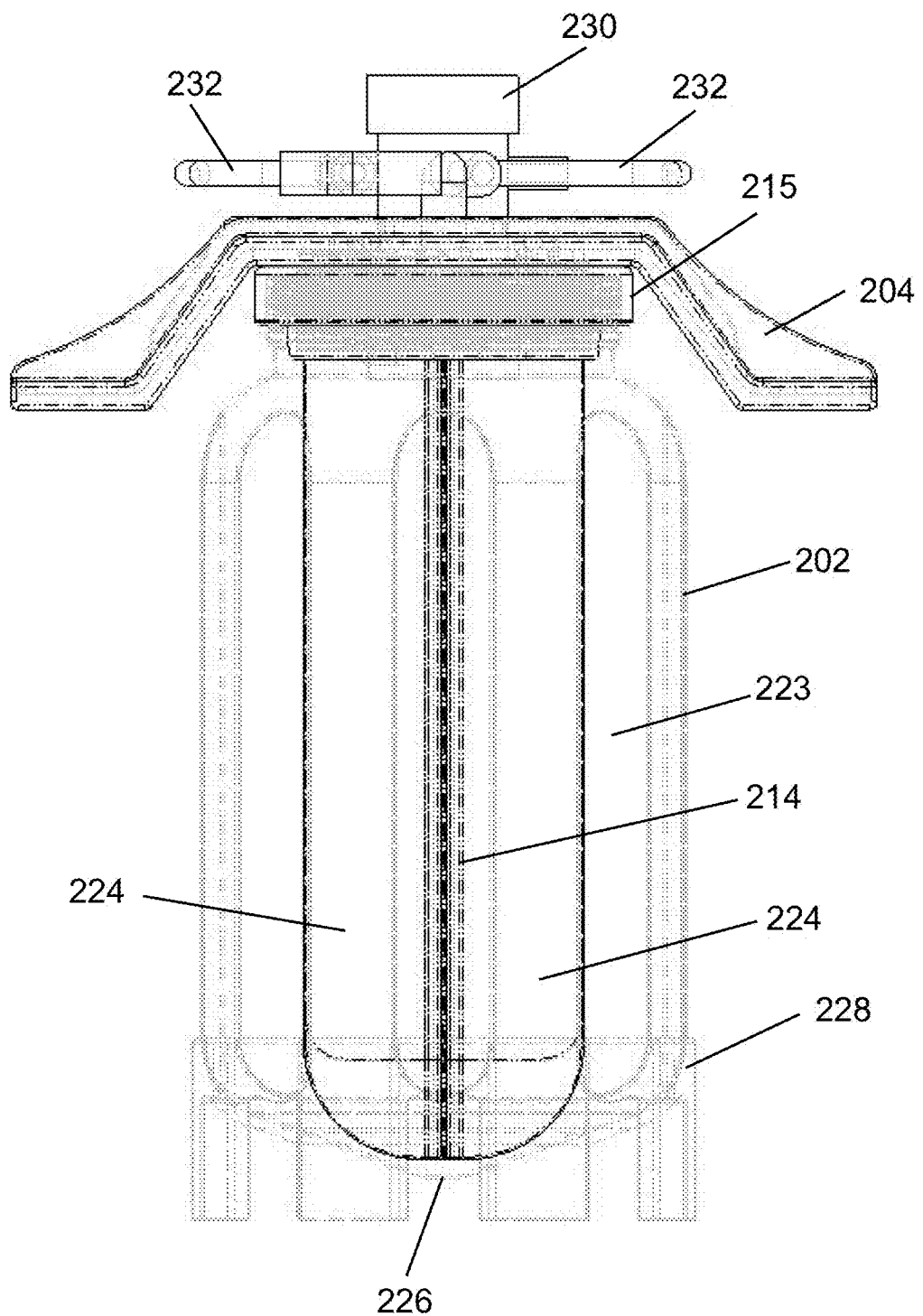
FIG. 4B is another front view of the spraying toolset of FIG. 1.
Figure 4C:
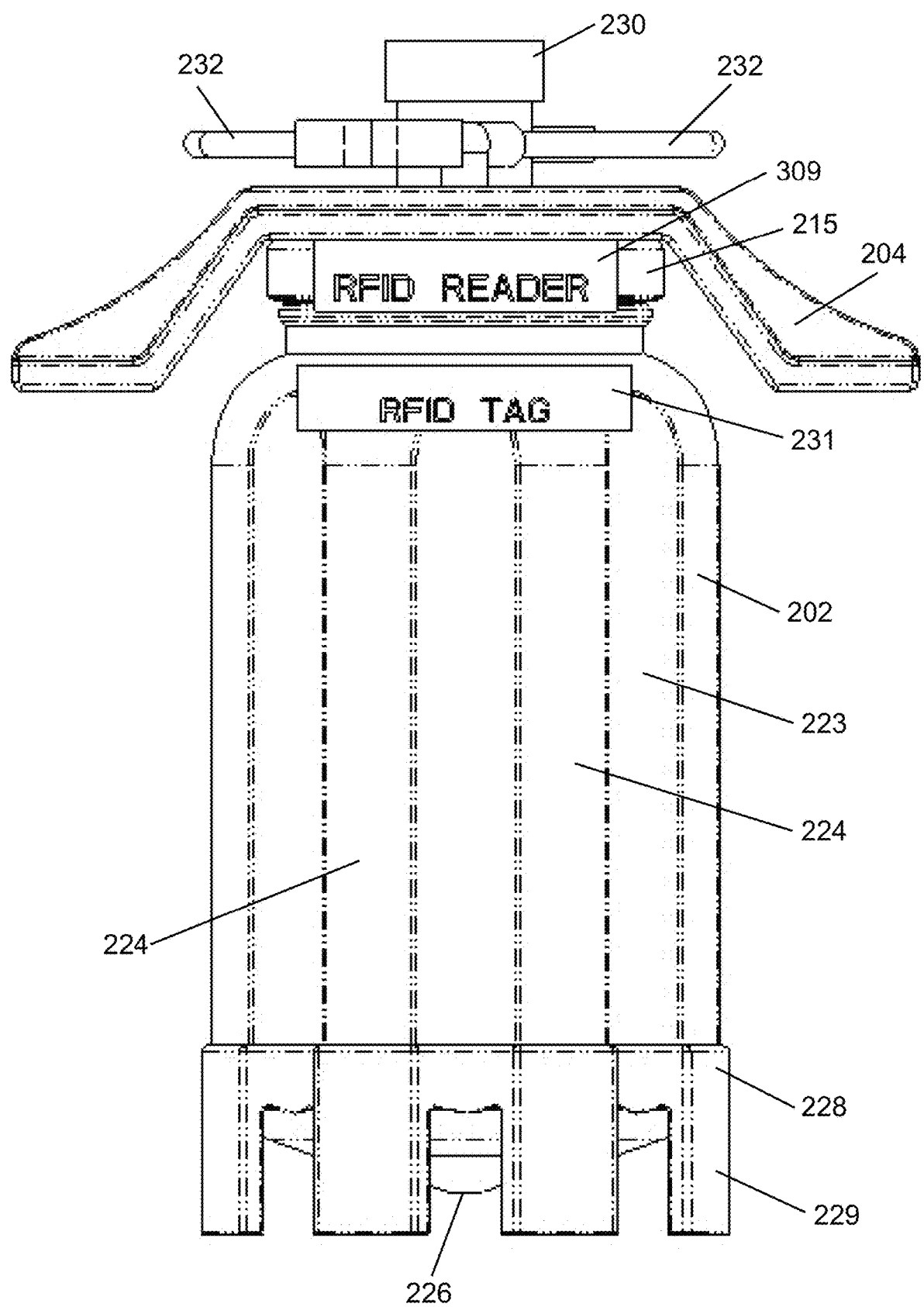
FIG. 4C is another front view of the spraying toolset of FIG. 1.
Figure 4D:
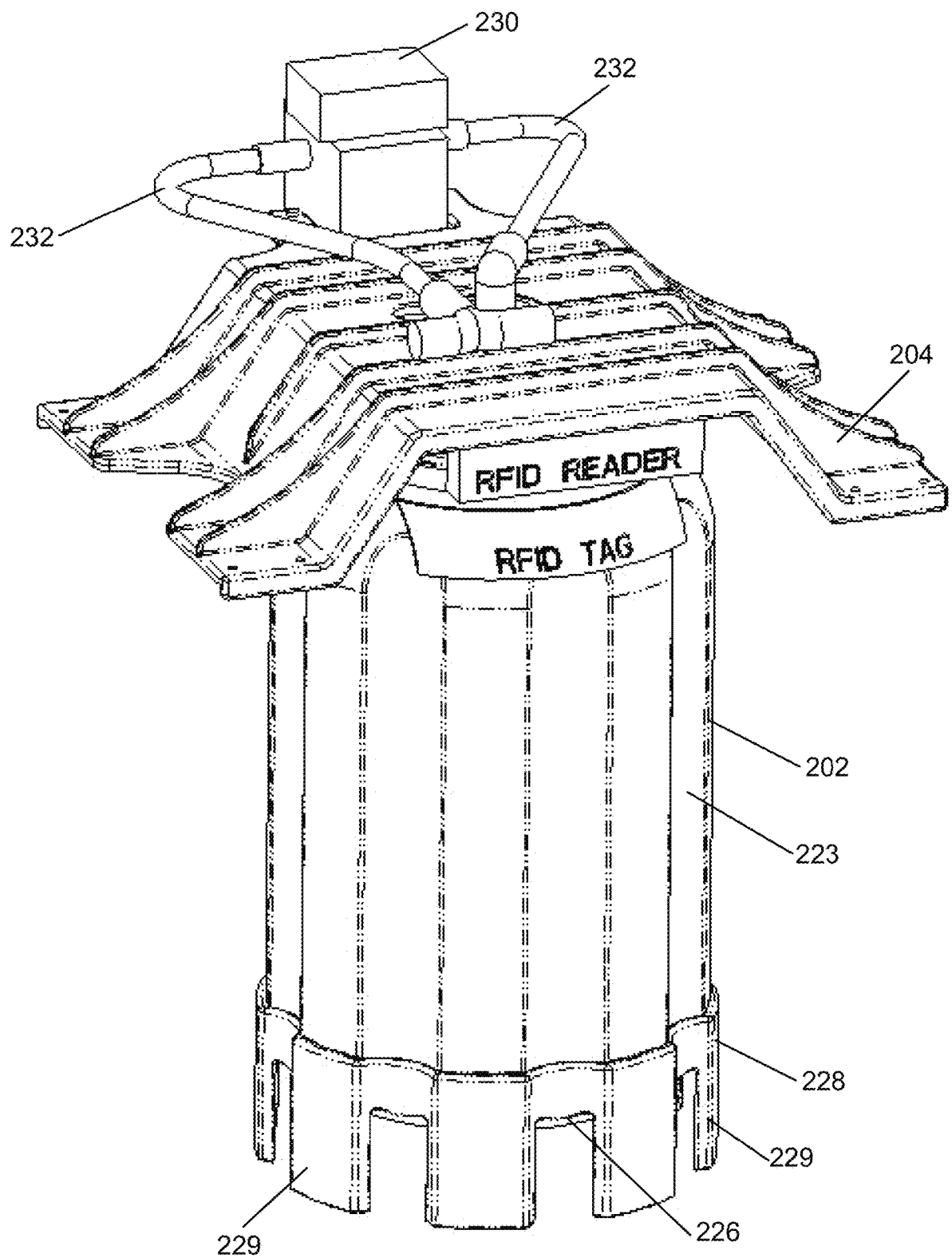
FIG. 4D is a perspective view of the spraying toolset of FIG. 1.
Figure 4E:
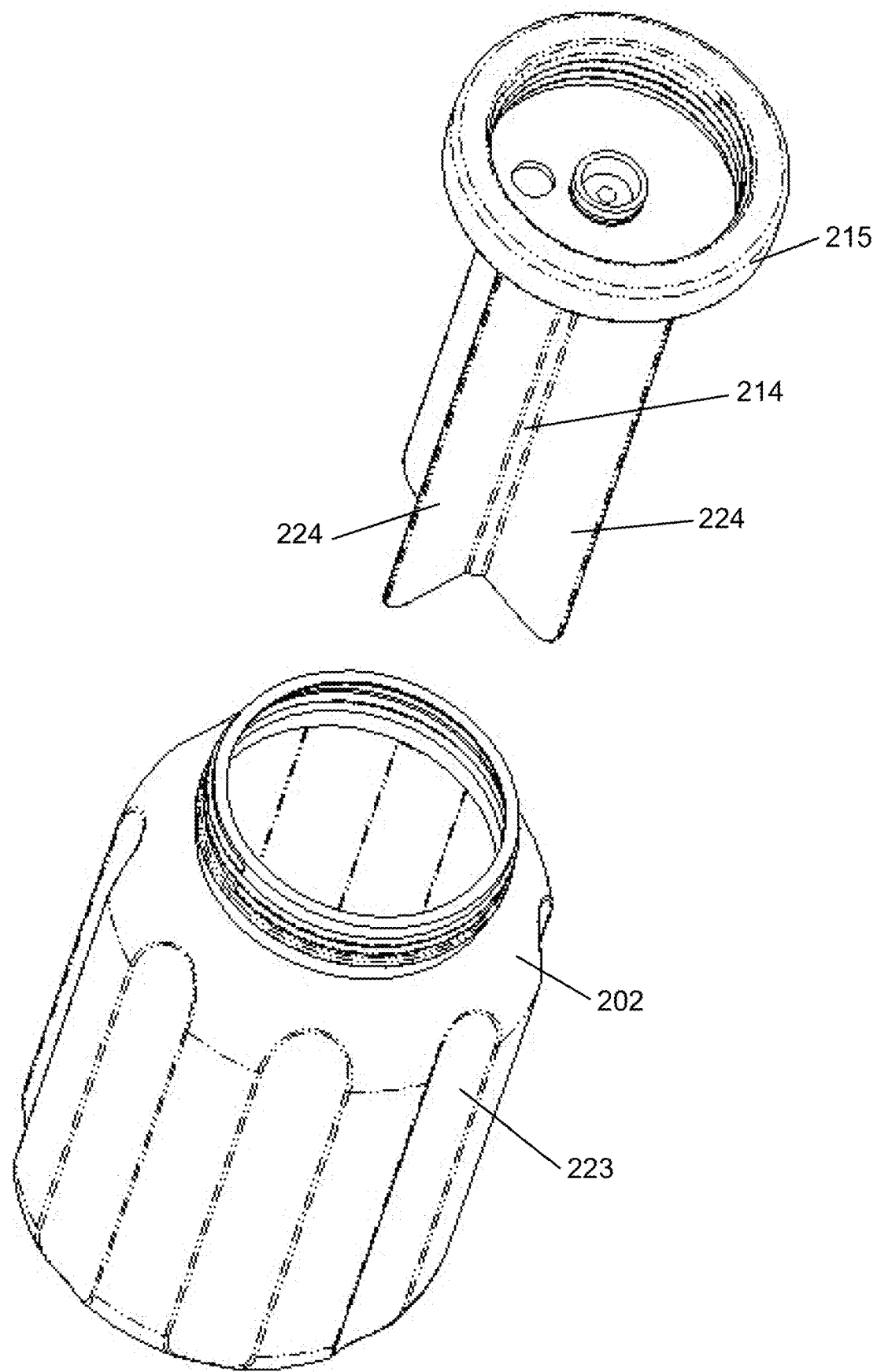
FIG. 4E is a perspective view of the cartridge and insert of the spraying tool of FIG. 1.
Figure 4F:
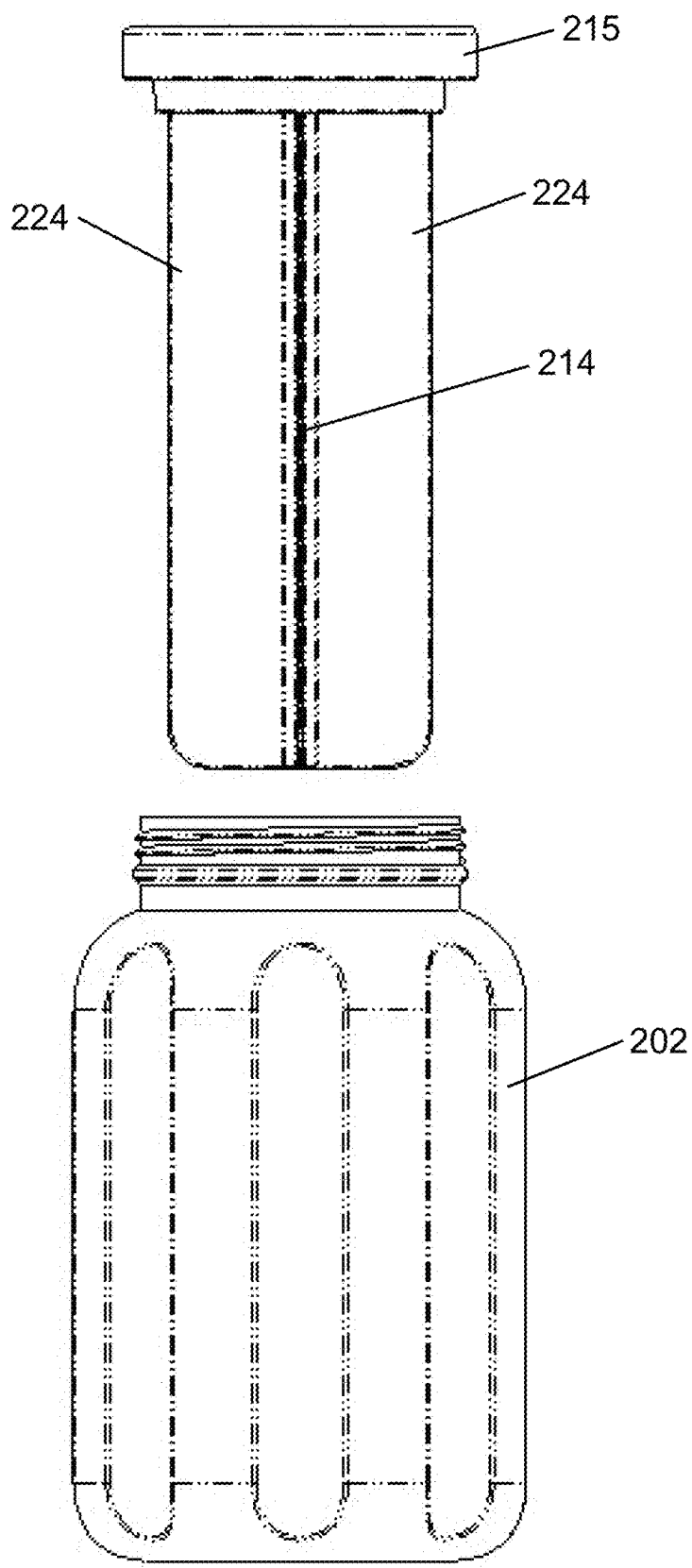
FIG. 4F is a side view of the cartridge and insert of the spraying tool of FIG. 1.

UAV 100 is equipped with a spraying toolset 200 for delivering economic poisons, which are commonly defined as chemicals in the form of fertilizers, pesticides and/or biocontrols to pre-determined locations or paths in a field. Spraying toolset 200 comprises of at least one cartridge 202, whereas the illustrated embodiment shows three cartridges 202*a*, 202*b*, 202*c*. It is preferred to have the center of mass of UAV 100 with toolset 200 in the center of the frame for balance. In the case of toolset 200 comprising a single cartridge 202 (as shown in FIG. 3), cartridge 202 would be mounted in the center. Whereas in the case of toolset 200 comprising three cartridges 202*a*, 202*b*, 202*c*, FIGS. 1-2 show them evenly spaced. Furthermore, as will be discussed below, it is desirable for the pumping mechanism to remove a generally and substantially even amount of chemical from each cartridge to keep the center of mass generally centered on UAV 100. One skilled in the art would recognize that any amount of cartridges 202 can be added without departing from the scope of this disclosure.

Cartridges 202 are attached to UAV 100 by a manifold 204. Manifold 204 can be configured for holding a single cartridge 202 or multiple cartridges 202, such as the case of FIGS. 1-2 that shows three cartridges 202*a*, 202*b*, 202*c*. In each case, the principals of manifold 204 are generally the same.

Figure 5A:
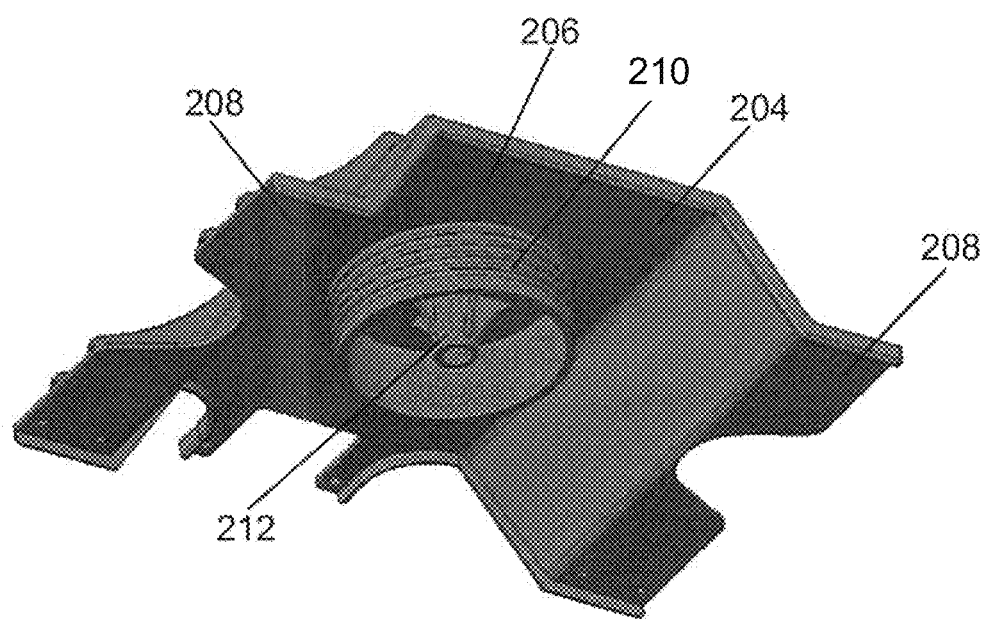
FIG. 5A is a bottom-side perspective view of the manifold from the spraying toolset of FIG. 1.
Figure 5B:
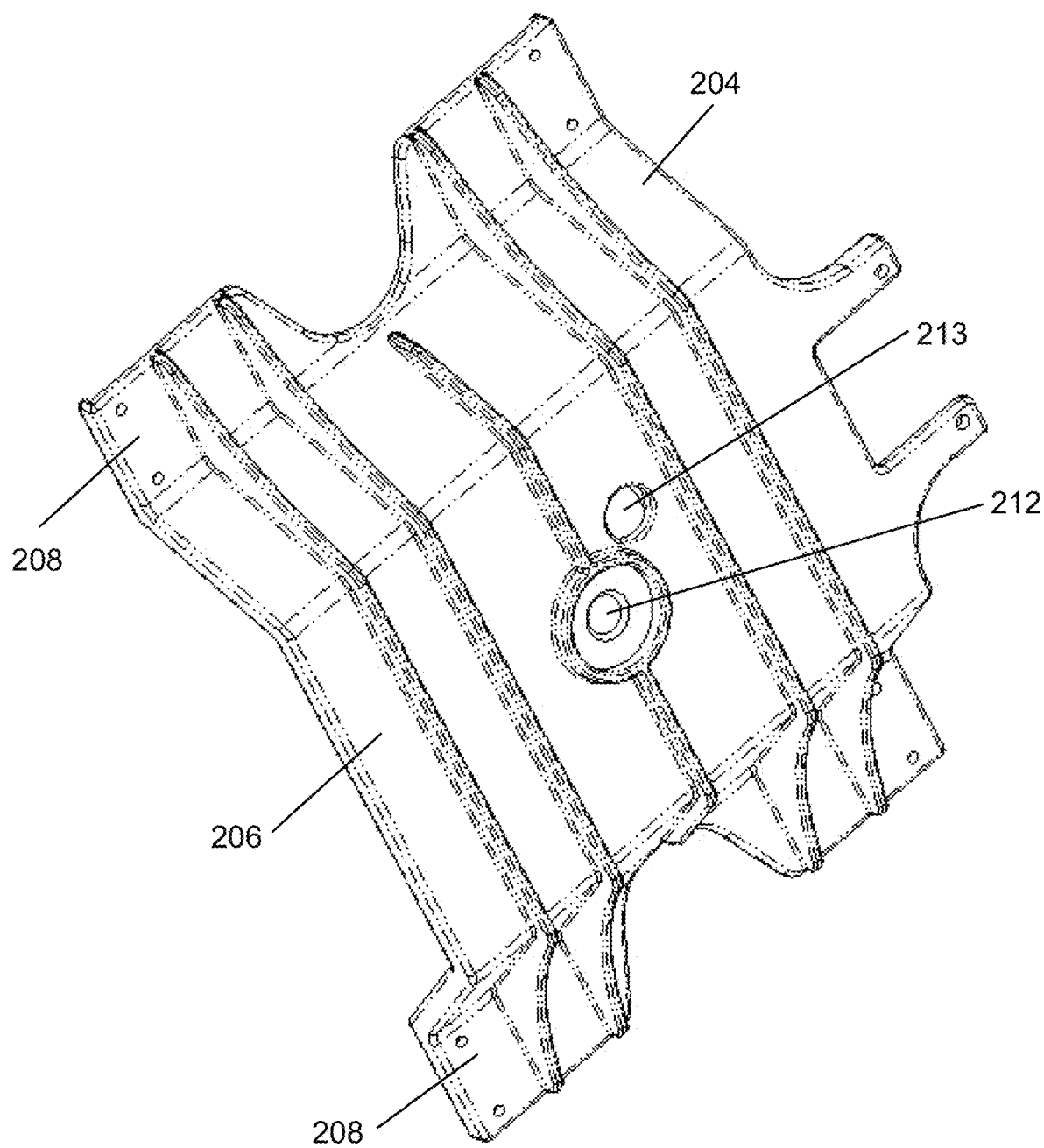
FIG. 5B is a top-side perspective view of the manifold from the spraying toolset of FIG. 1.
Figure 6A:
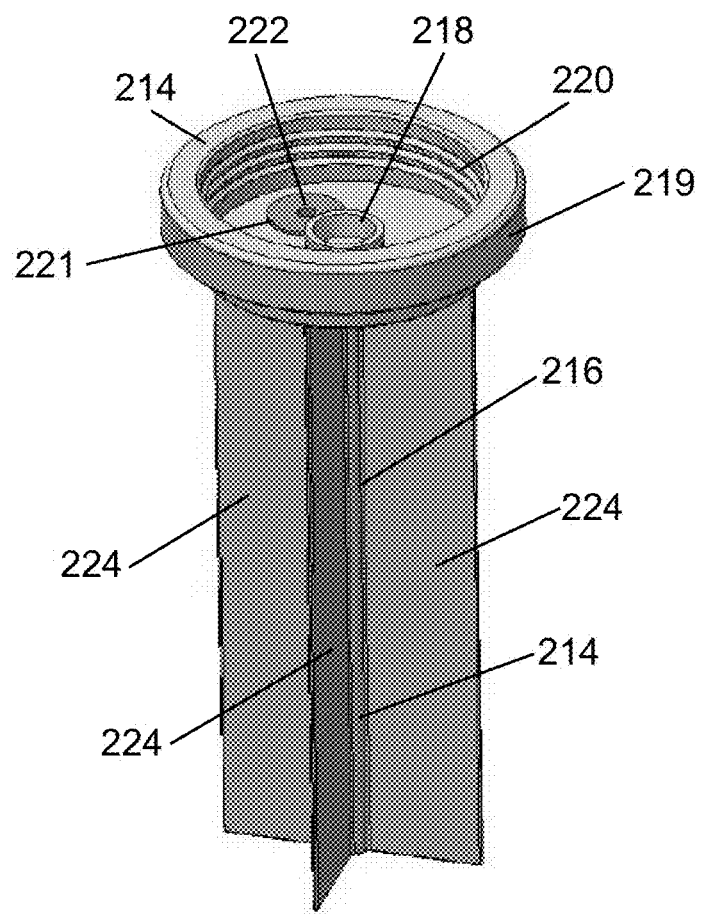
FIG. 6A is a perspective view of the cartridge insert from the spraying toolset of FIG. 1.
Figure 6B:
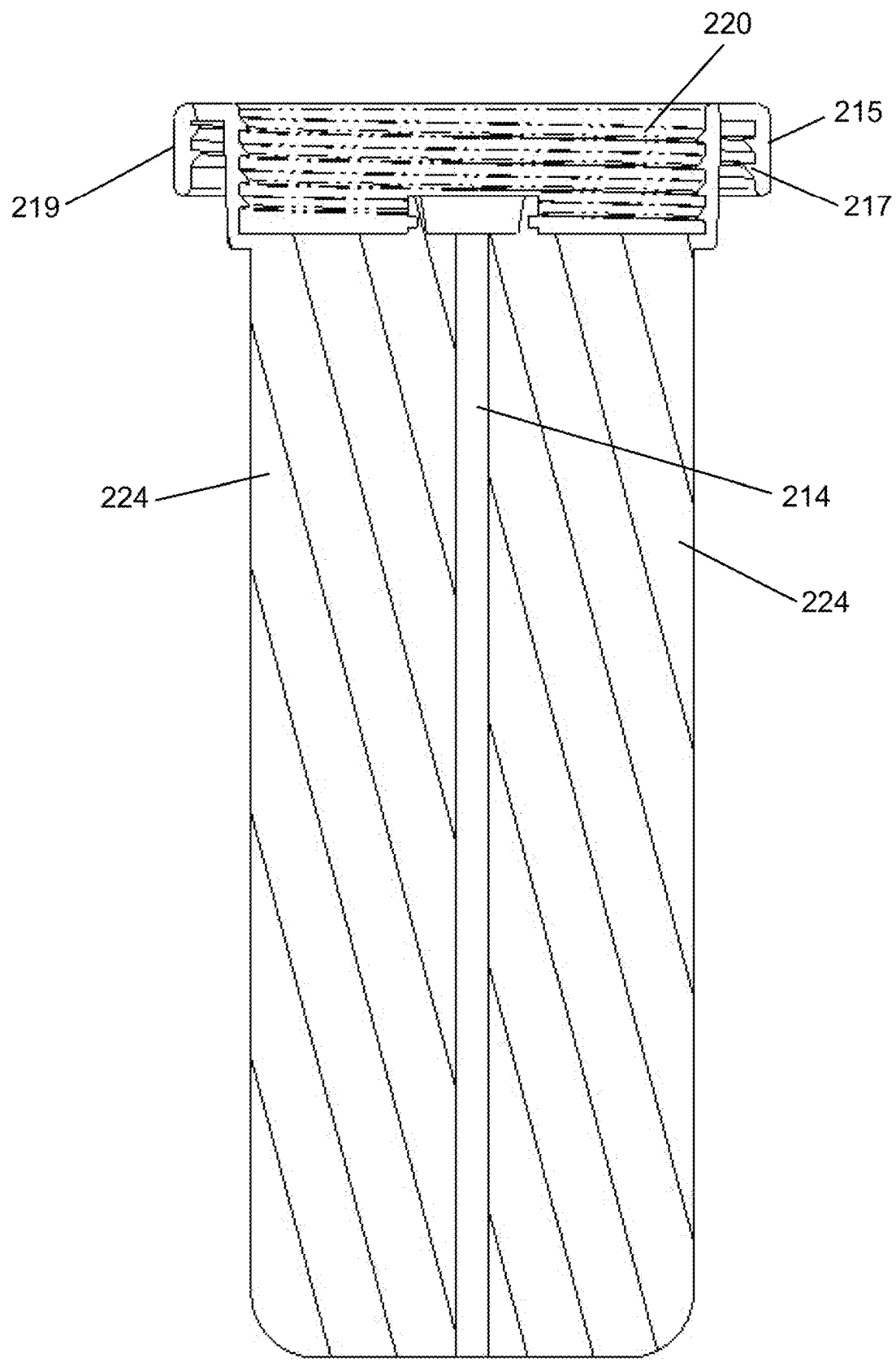
FIG. 6B is a side view of the cartridge insert from the spraying toolset of FIG. 1.
Figure 7:
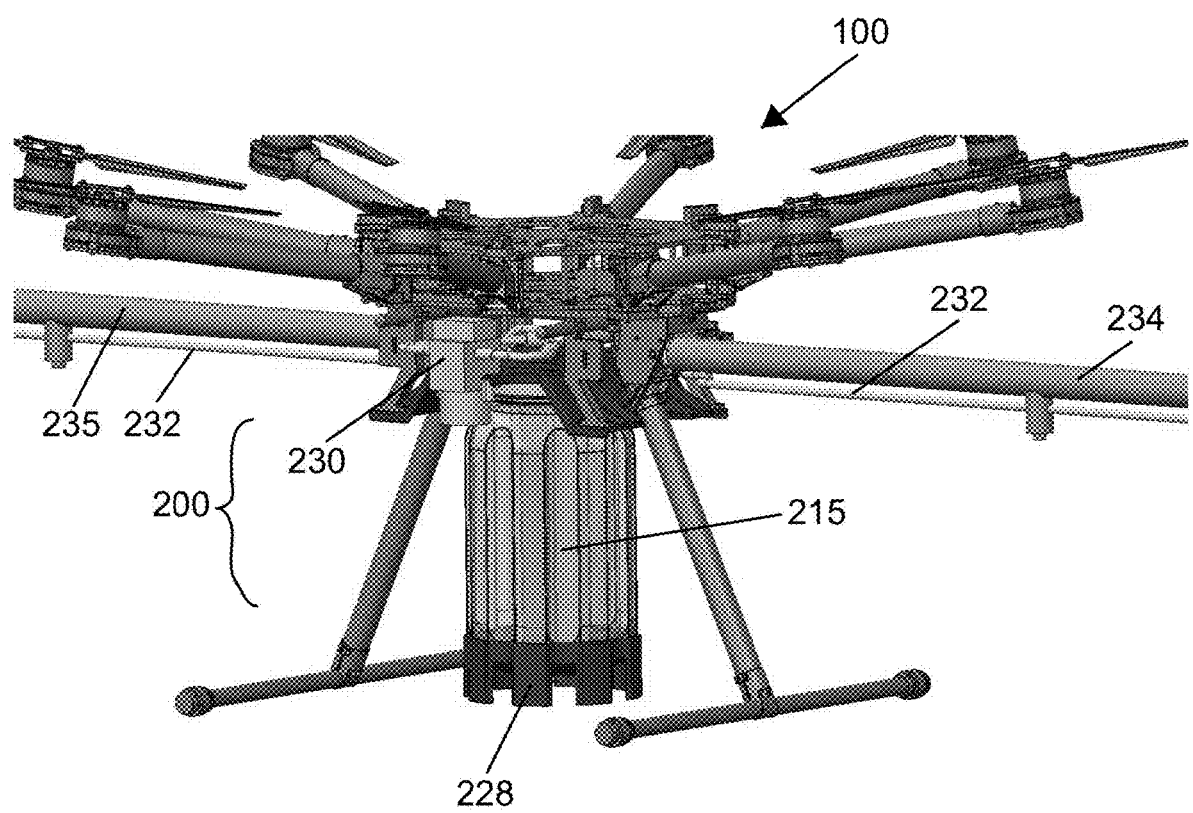
FIG. 7 is a perspective view of a UAV with a spraying tool with a single cartridge according to this disclosure.
Figure 8:
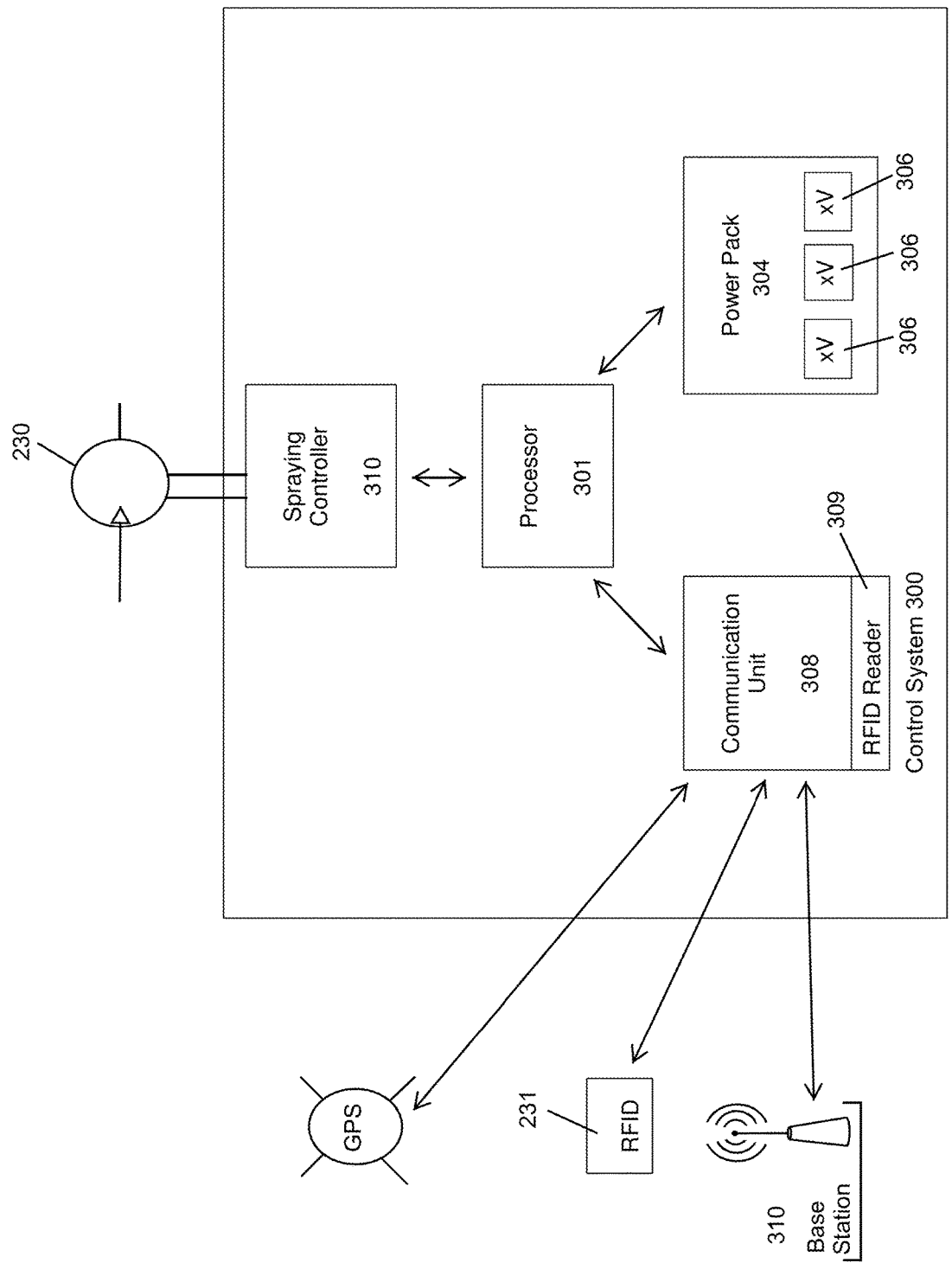
FIG. 8 is a block diagram of the control system for the UAV of FIG. 1.

FIG. 4 shows a manifold 204 with a single cartridge 202 detached from UAV 100 and the rest of the spraying toolset 200. FIG. 5 shows manifold 204 isolated from cartridge 202 and FIG. 6 shows a cartridge insert 215 isolated from manifold 204. Turning first to FIG. 5, manifold 204 has an upper surface 206 with an attachment mechanism 210 positioned in the center of upper surface 206 for attaching manifold 204 to cartridge 202. Depending on the configuration of UAV 100, manifold 204 can be designed to fit within its structure. The illustrated embodiment shows manifold 204 with upper surface 206 above two lower surfaces 208 to position the bottom of cartridge 202 off the ground when UAV 100 has landed. Attachment mechanism 210 can be any type of attaching mechanism although the illustrated embodiment shows a male-threaded connector. Concentrically centered in the center of upper surface 206 is a tube 212 for mating with a suction tube 214 that fits inside cartridge 202. The top side of manifold 204 shows an additional air hole 213 for equalizing the air pressure inside cartridge 202.

FIG. 6 shows a cartridge insert 215 comprising a cap 219 with threads 217 on the inside to attach cartridge insert 215 to cartridge 202. An attachment mechanism 220 is provided on cartridge insert 215 that corresponds with attachment mechanism 210 of manifold 204 to secure these parts together. In the illustrated embodiment, the inner diameter of cap 219 contains a volume of space 221 which is circumscribed by attachment mechanism 220 which is a female-threaded connector to mate with the male-threaded connector of attachment mechanism 210.

Inside volume of space 221 of cartridge insert 215 is an opening to a suction tube 214 that extends generally the depth of cartridge 202. At the top of suction tube 214 is an o-ring seal 218 for receiving tube 212 of manifold 204 and providing a hermetic seal. It should be noted that a one-way valve could be attached to tube 212 and extend into the opening of suction tube 214 to balance the pressure. Such a one-way valve can include a duckbill valve. Positioned adjacent to the opening of suction tube 214 on cartridge insert 215 is a one-way valve 222 to allow air that from air hole 213 in manifold 204 into cartridge 202 so the contents can be sucked out.

Cartridge insert 215 is arrayed with a plurality of baffles 224 around suction tube 214. The illustrated embodiment shows four baffles 224, but more or less equally spaced baffles 224 can be provided. Baffles 224 prevent sloshing of the contents of cartridge 202, which is important to keep the center of mass located generally along a centerline of UAV 100. If the contents of cartridge 202 were allowed to slosh, the center of mass would constantly shift and make UAV more difficult to fly and the resulting spraying would be less evenly applied. Baffles 224 are attached to an outer perimeter of suction tube 214 and evenly spaced around its circumference.

Turning to FIG. 4, shown are cartridge insert 215 inside cartridge 202 mounted to manifold 204. An improvement to cartridge 202 is shown in the form of a cone bottom 226. This allows the contents of cartridge 202 to flow toward the bottom of cartridge 202 and with a corresponding suction tube 214 extending near the bottom of cartridge 202 most of the contents of cartridge 202 can be used. To accommodate cone bottom 226 on cartridge 202, a base 228 with a plurality of legs 229 can be press-fitted to the bottom of cartridge 202 so that it can stand upright. A pump 230 can be attached to manifold 204 or mounted somewhere on UAV 100 for removing the contents out of cartridge 202. A tube 232 extends from pump 230 to tube 212 of manifold 204 and to suction tube 214 inside cartridge 202. An air tube 232 mates with one-way valve 222 on cartridge insert 215 to let air into cartridge 202 for pressure rebalancing.

Cartridge 202 can have tamper-proof provisions such as a readable and writeable RFID tag that must satisfy the software requirements, such as an electronic token, in order to properly spray.

FIG. 7 shows a fully functional UAV 100 with spraying toolset 200. Contents from cartridge 202 that are removed by pump 230 are dispersed via a network of tubes 232 that extend along extendable booms 234. Extendable booms 234 give UAV 100 an adjustable coverage area for dispersing the contents of cartridge 202. One skilled in the art would recognize that other types of booms, for example, fixed booms, trusses, and the like can be used.

FIG. 8 shows a control system 300 for UAV 100. Control system 300 comprises a processor 301 with system memory and storage for one or more software applications and the drivers necessary to enable the functions described below.

A power pack 302 is provided for supplying power to the motors of UAV 100, spraying toolset 200, including pump 230, and to all components of control system 300. Powerpack 304 may comprise one or more rechargeable and replaceable batteries 306. A communication unit 308 communicates with base station 310 to transmit and receive instructions, including but not limited to mapping instructions and disbursement requirements. Communication unit 308 can include components for any communication protocol, including Wi-Fi, radio, GPS, and RFID.

A control system 300 is provided to control the spraying function through control of one or more pumps 230. Level sensors can be provided on cartridge 202 to provide level information to processor 301 so that it knows when it needs to return to base station 310.

FIG. 9 shows a software platform 320 residing in control system 300 for execution by processor 301. Software platform 320 receives a variety of inputs, including crop imaging inputs 322 from one or more cameras, agronomy inputs 324 that can be manually inputted or supplied from one or more external databases, weather inputs 326 that can come from external databases, geographical inputs 328 that can also come from external databases, chemical inputs 330 that can be manually inputted or come from external databases, and a unique identification 332 from RFID tag 231 for uniquely identifying cartridge 202. Software platform 320 uses these inputs to supply pre-determined or dynamic control to UAV 100. Software platform 320 also receives from UAV 100 real-time flight status information as well as information from control system 300 and powerpack 304 for feedback control of UAV 100.

One or more components of the systems and methods for controlling UAV 100 or the fertilizer disbursement or tendering system can comprise any collection of processor-based devices or computing devices operating together, or components of processing systems or devices, as is known in the art. The processing system in control system 300 can include, for example, one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem in control system 300. The processing system can also include or be coupled to one or more databases for receiving the inputs described above or storing other information. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the systems and methods herein described can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages. These communication paths can connect, for example, control system 300 with GPS or base station 310.

Aspects of the systems and methods described herein may be implemented as functionality programmed into any of a variety of circuitry, including programmable logic devices (PLDs), such as field-programmable gate arrays (FPGAs), programmable array logic (PAL) devices, electrically programmable logic and memory devices and standard cell-based devices, as well as application-specific integrated circuits (ASICs). Some other possibilities for implementing aspects of the systems and methods include: microcontrollers with memory (such as electronically erasable programmable read only memory (EEPROM)), embedded microprocessors, firmware, software, etc. Furthermore, aspects of the systems and methods described herein may be embodied in microprocessors having software-based circuit emulation, discrete logic (sequential and combinatorial), custom devices, fuzzy (neural) logic, quantum devices, and hybrids of any of the above device types. Of course, the underlying device technologies may be provided in a variety of component types, e.g., metal-oxide-semiconductor field-effect transistor (MOSFET) technologies like complementary metal-oxide-semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer-aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above-described components may be processed by a processing entity (e.g., one or more processors) within the computer system in conjunction with the execution of one or more other computer programs.

For security purposes, each cartridge 202 can have tamper-proof provisions with readable/writeable communications technology, such as an RFID tag 231 that can be read by an RFID reader 309 in or in communication with communications unit 308 in control system 300. RFID tag 231 must match corresponding information stored in a database accessible by control system 300, for example, by way of an electronic token, in order to properly spray. In other words, a security protocol can be implemented to prevent UAV 100 or pump 230 from operating if the RFID tag 231 on cartridge 202 does not match predefined instructions or strays outside of the predefined area. In this regard, control system 300 can associate the unique identification for RFID tag 231 with instructions for determining the operation of pump 230 or UAV 100. This feature can be used in conjunction with an automated or semi-automated tendering system that refills cartridges 202 to control the type of contents in cartridge 202 and prevent the system from operating with a cartridge 202 that has not been pre-approved.

RFID tag 231 and corresponding RFID Reader 309 can be an active RFID or passive RFID. An active RFID tag 231 comprises its own transmitter and power source and can include, for example, Bluetooth® Low Energy beacons. Bluetooth low energy (BLE) is a wireless technology standard for personal area networks. BLE is targeted for very low power devices, i.e. devices that can run on a coin cell battery for months or years. Under an embodiment, Bluetooth enabled beacons/devices may comprise Bluetooth integrated circuit implementations. Updates to embedded code of a Bluetooth enabled device may be accomplished through firmware over the air upgrades. Mobile device operating systems may natively support the Bluetooth low energy wireless communications protocol. Such operating systems include iOS, Android, Windows Phone and BlackBerry, as well as OS X, Linux, and Windows 8.

RFID tag 231 and corresponding RFID Reader 309 can also be a passive RFID, such as tags and microchips. In such embodiments, passive RFID devices do not have a power source or may have a power source but are energized by an external wand or reader passed in close proximity to energize a capacitor within the passive RFID and discharge (i.e. transmit) an RF signal to the reader for identification of the tag.

UAV 100 can refill or exchange its cartridges and/or swap batteries at a base station. The base station can be a mobile or fixed platform positioned near the field. The base station can include a take-off and landing platform for UAV 100. An automated or semi-automated tendering system can be provided for accepting empty cartridges and swapping in replacement filled cartridges. The automated or semi-automated tendering system can have a mechanism in place to remove the empty cartridges. This could be, for example, a rotary base for attaching to and unscrewing a thread-connected cartridge. Similarly, a rotary base under a replacement cartridge can locate and attach the cartridge to UAV 100.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:
1. An unmanned aerial vehicle (UAV) comprising:
   a manifold attached to the UAV;
   a cartridge removably and replaceably attached to the manifold;
   an insert inside the cartridge for drawing contents out of the cartridge, wherein the insert further comprise a suction tube and a plurality of baffles around a circumference of the suction tube; and
   a pump combined to the suction tube of the insert for drawing contents out of the cartridge in response to commands.

2. The UAV of claim 1, and further comprising: an attachment mechanism on an underside of the manifold and a corresponding attachment mechanism to the insert wherein the attachment mechanism of the manifold selectively attaches to the attachment mechanism of the insert for securing the cartridge to the manifold.

3. The UAV of claim 2, wherein the attachment mechanism on the underside of the manifold is a threaded connector and wherein the attachment mechanism to the insert is a threaded connector.

4. The UAV of claim 3, wherein the manifold further comprises: a first tube extending from the pump to the underside of the manifold concentric with the male threaded connector to selectively attach to the suction tube of the insert.

5. The UAV of claim 4, and further comprising an opening from the top of the manifold into a volume of space between the attachment mechanism of the manifold and the attachment mechanism of the insert, and a one-way valve in the insert to allow air into the cartridge.

6. The UAV of claim 1, wherein the insert further comprises four baffles extending along a portion of a length of the suction tube of the insert and concentrically spaced around the suction tube to reduce movement of liquid in the cartridge.

7. The UAV of claim 1, wherein the cartridge further comprises of a cone bottom and the suction tube of the insert extends substantially near the cone bottom.

8. The UAV of claim 1, wherein the cartridge further comprises of a base surrounding the insert allows the cartridge to stand upright.

9. The UAV of claim 1, wherein the insert further comprises: a cap with a first pair of threads for engaging threads on the cartridge and attaching the insert to the cartridge; and a second pair of threads for engaging threads on the manifold and attaching the insert and the cartridge to the manifold.

10. The UAV of claim 1, and further comprising an RFID tag combined to the cartridge and an RFID reader combined to the manifold for uniquely identifying the cartridge.

11. The UAV of claim 10, and further comprising a control system communicatively coupled the RFID reader for receiving from the RFID reader a unique identification from the RFID tag on the cartridge and associating the unique identification for the RFID tag with instructions for determining the operation of the pump or the UAV.

12. A system for tendering chemicals to an unmanned aerial vehicle (UAV) for application in an area of interest, the system comprising:
   a cartridge for storing chemicals to be applied by the UAV in an area of interest; and a removable insert combinable to the cartridge comprising:
a suction tube selectively positioned in fluid communication with a pump for removing chemicals from the cartridge for application by the UAV, a plurality of baffles around a circumference of the suction tube for dampening movement of the chemicals while the UAV is in motion.

13. The system of claim 12, and further comprising an RFID tag adapted for communication with an RFID reader combined to the UAV for uniquely identifying the cartridge.

14. The system of claim 13, wherein the unique identification for the RFID tag is associated with instructions for determining the operation of the pump or the UAV.

15. The system of claim 14, wherein the cartridge comprises a depressed bottom for directing chemicals in the cartridge to the bottom for emptying the cartridge by the pump via the suction tube.

16. An unmanned aerial vehicle (UAV) comprising:
a manifold attached to the UAV;
a cartridge removably and replaceably attached to the manifold;
a removable insert inside the cartridge for drawing contents out of the cartridge, wherein the insert further comprise a suction tube selectively positioned in fluid communication with a pump for removing chemicals from the cartridge for application by the UAV, a plurality of baffles around a circumference of the suction tube for dampening movement of the chemicals while the UAV is in motion; and
the pump combined to the suction tube of the insert for drawing contents out of the cartridge in response to commands.

17. The UAV of claim 16, and further comprising an RFID tag attached to the cartridge adapted for communication with an RFID reader combined to the UAV for uniquely identifying the cartridge, and wherein the unique identification for the RFID tag is associated with instructions for determining the operation of the pump or the UAV.

18. The UAV of claim 16, wherein the cartridge comprises a depressed bottom for directing chemicals in the cartridge to the bottom for emptying the cartridge by the pump via the suction tube.

19. The UAV of claim 16, wherein the insert further comprises: a cap with a first pair of threads for engaging threads on the cartridge and attaching the insert to the cartridge; and a second pair of threads for engaging threads on the manifold and attaching the insert and the cartridge to the manifold.

* * * * *